(12) United States Patent
Ito

(10) Patent No.: US 7,272,410 B2
(45) Date of Patent: Sep. 18, 2007

(54) RADIO COMMUNICATION DEVICE AND A METHOD FOR ESTABLISHING RADIO CONNECTION

(75) Inventor: Takafumi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 505 days.

(21) Appl. No.: 10/793,146

(22) Filed: Mar. 4, 2004

(65) Prior Publication Data

US 2004/0266443 A1 Dec. 30, 2004

(30) Foreign Application Priority Data

Jun. 30, 2003 (JP) ............................ P2003-187025

(51) Int. Cl.
*H04M 1/00* (2006.01)
(52) U.S. Cl. ............................. 455/550.1; 455/575.1; 455/41.2
(58) Field of Classification Search ............ 455/550.1, 455/575.1, 41.2, 41.3, 517; 381/74; 700/94; 379/93.02
See application file for complete search history.

(56) References Cited

U.S. PATENT DOCUMENTS

| | | | |
|---|---|---|---|
| 5,551,066 A | 8/1996 | Stillman et al. | |
| 6,028,600 A | 2/2000 | Rosin et al. | |
| 6,442,628 B1 | 8/2002 | Bastiani et al. | |
| 7,177,595 B2 | 2/2007 | Hamada et al. | |
| 2001/0016874 A1 | 8/2001 | Ono et al. | |
| 2002/0039424 A1* | 4/2002 | Watanuki | 381/74 |
| 2002/0177411 A1* | 11/2002 | Yajima et al. | 455/41 |
| 2003/0054810 A1 | 3/2003 | Chen et al. | |
| 2003/0064715 A1 | 4/2003 | Sugane | |
| 2003/0114199 A1 | 6/2003 | Takeyasu | |
| 2004/0203676 A1 | 10/2004 | Awada | |
| 2006/0238504 A1 | 10/2006 | Kunii et al. | |

FOREIGN PATENT DOCUMENTS

| | | |
|---|---|---|
| EP | 0 856 812 A2 | 8/1998 |
| GB | 2 328 304 A | 2/1999 |
| JP | 11-355841 | 12/1999 |
| JP | 2001-144767 | 5/2001 |
| JP | 2001-177599 | 6/2001 |
| JP | 2002010352 * | 1/2002 |
| JP | 2002-073565 | 3/2002 |
| JP | 2002-261686 | 9/2002 |
| JP | 2002-359623 | 12/2002 |
| JP | 2002-359873 | 12/2002 |
| JP | 2003-087363 | 3/2003 |
| JP | 2004-015484 | 1/2004 |
| WO | WO-00 28455 | 5/2000 |
| WO | WO-02 01379 A2 | 1/2002 |

* cited by examiner

*Primary Examiner*—Melur Ramakrishnaiah
(74) *Attorney, Agent, or Firm*—Blakely Sokoloff Taylor & Zafman, LLP

(57) ABSTRACT

A method for establishing a radio connection between radio communication devices, has the operations of (1) operating a first connection switch in a first radio communication device, (2) operating a second connection switch in a second radio communication device, and (3) establishing a radio connection between the first radio communication device and the second radio communication device when a time difference between each operation of the first connection switch and the second connection switch is within a predetermined time period.

15 Claims, 9 Drawing Sheets

RADIO COMMUNICATION DEVICE AND A METHOD FOR ESTABLISHING RADIO CONNECTION

CROSS-REFERENCE TO RELATED APPLICATIONS

This application is based upon and claims the benefit of priority from Japanese Patent Application No. 2003-187025, filed Jun. 30, 2003, the entire contents of which are incorporated herein by reference.

BACKGROUND

1. Field

This invention relates to a radio communication device that communicates with an external device over a radio connection, and a method for establishing the radio connection between radio communication devices.

2. Description of the Related Art

Recently, radio connection techniques have been developed between electronic devices of different types by using, for example, a BLUETOOTH™ (hereinafter "BT") standard radio communication system. Specifically, there are developed electronic devices such as wireless phones that receive digital audio signals over radio communication from, for example, portable audio players and replay the signals.

Meanwhile, BT-standard radio communication systems employ a radio communication connection method in which an electronic device such as an audio player, working as a master device, conducts a search for slave devices and selects an electronic device such as a headphone, from a plurality of detected slave devices for use as a communication connection.

According to conventional radio communication connection methods, such as BT-standard, an electronic device operating as a master device is configured with an operation method for establishing communication connection with slave devices. The operation method, however, requires the user to have access to an interface for inputting data or menu selection. Examples of different types of interfaces may include a display device to display information, a mouse and/or a keyboard.

However, for certain devices, such as an audio headphone, it is very difficult to implement the operation method for the establishing communication connection therein. The reason is that the interface for certain devices may only a few LEDs (light emitting diodes) for a display device and a few buttons for an input device. Even when the operation method could be implemented, the small and limited interface makes users difficult to operate it.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Embodiments of the present invention will be described hereinafter with reference to the accompanying drawings. Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

Figure 1:
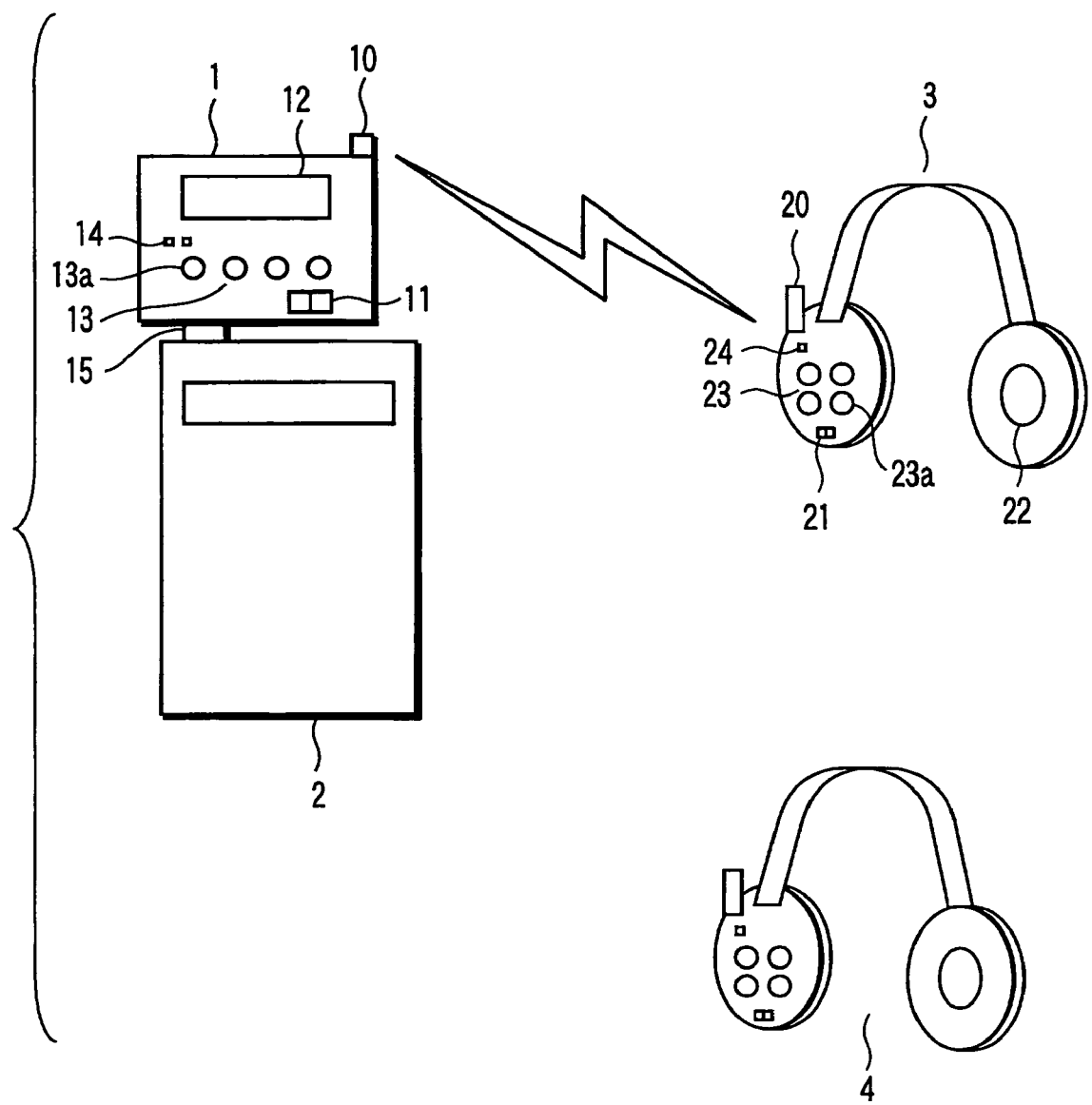
FIG. 1 is an exemplary diagram showing a radio communication system with a wireless headphone, and an audio conversion adapter according to an embodiment of the present invention.
Figure 2:
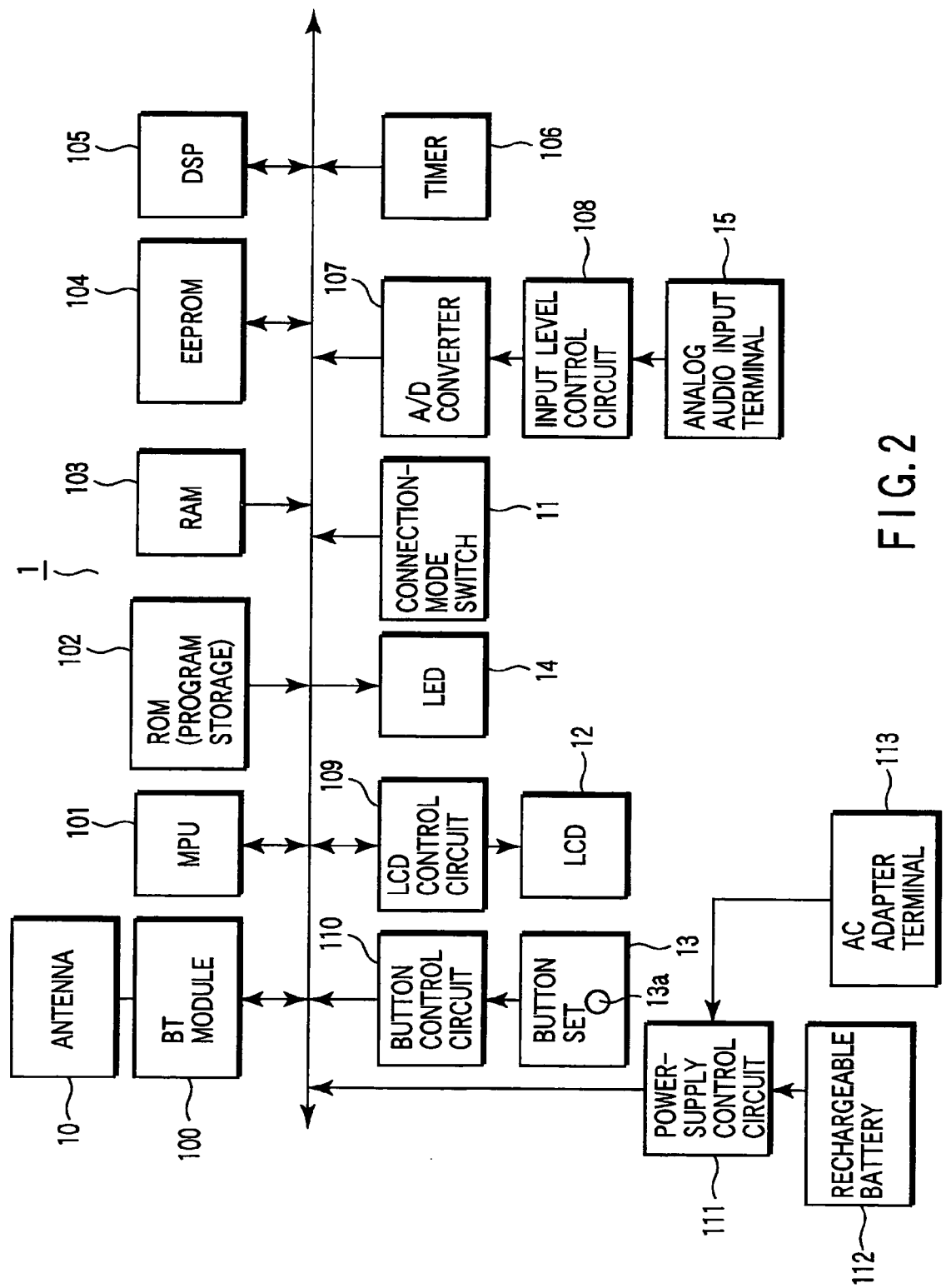
FIG. 2 is an exemplary block diagram showing a configuration of the audio conversion adapter in FIG. 1 in the embodiment.
Figure 3:
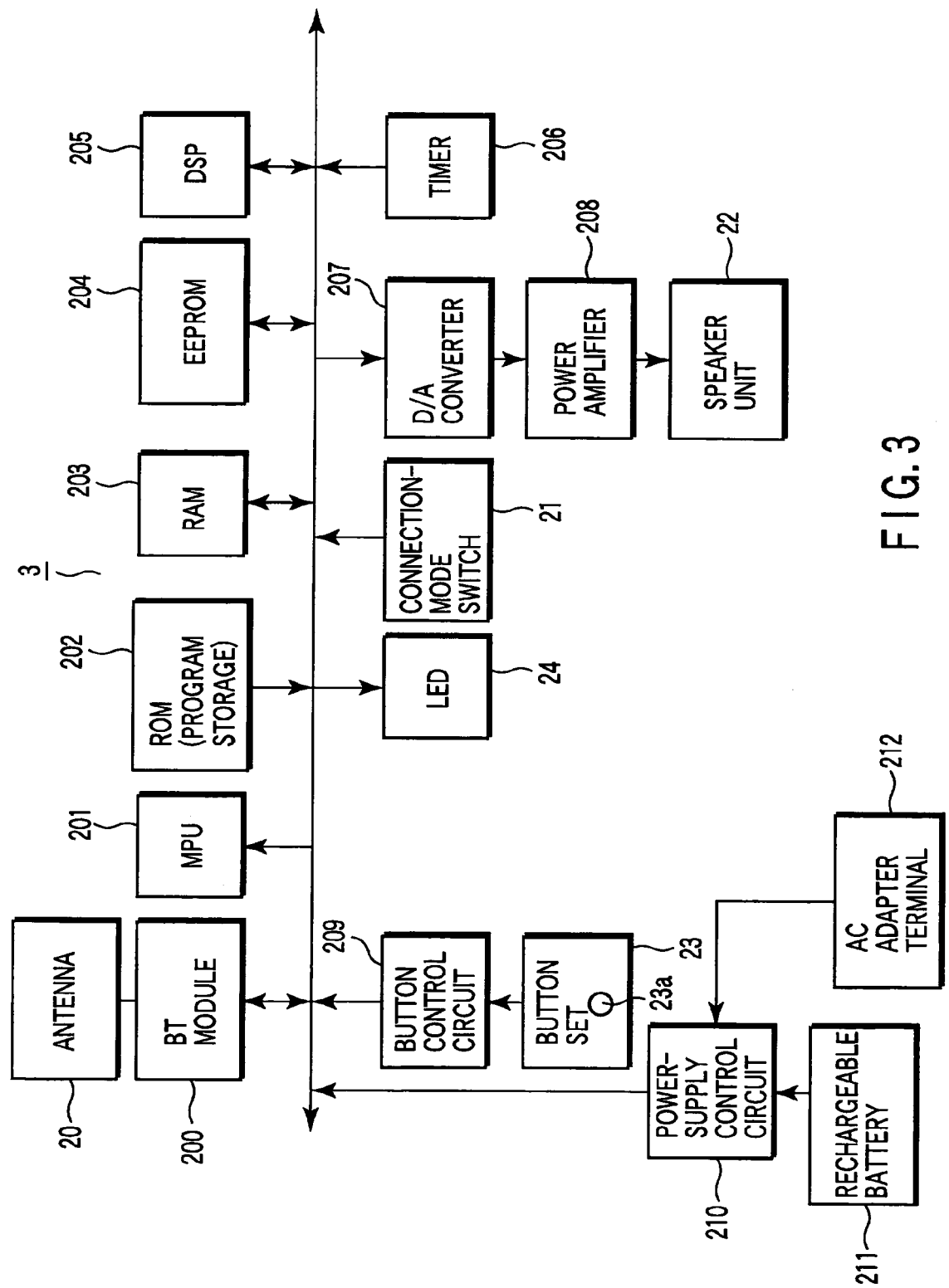
FIG. 3 is an exemplary block diagram showing a configuration of the wireless headphone in FIG. 1 in the embodiment.

FIG. 1 shows an exemplary wireless communication system including an audio conversion adapter 1 and a wireless headphone 3 and 4. A hardware configuration of the audio conversion adapter 1 is shown in FIG. 2, and a hardware configuration of the wireless headphone 3 and 4 are shown in FIG. 3.

The audio conversion adapter 1 and the wireless headphone 3 and 4 are compliant with the BT standard.

The audio conversion adapter 1 (hereinafter "BT adapter") is contemplated as an electronic device operating as a master device. The wireless headphones 3 and 4 (hereinafter "BT headphones") as electronic devices corresponding to slave devices.

The BT adapter 1 has a BT-standard radio communication functionality and radio-transmits audio data. The BT-standards include "AV profile" standards for radio transmission and reception of high fidelity audio data, thereby enabling radio-communicated music data to be received or replayed.

As shown in FIG. 1, the BT adapter 1 connects to a portable audio player 2 (which hereinafter will be shortly referred to as a "player") via a headphone terminal 15. The player 2 replays music digital data stored in a storage medium, such as a semiconductor memory device, a memory card, or a hard disk, and outputs the data as an analog audio signal from the headphone terminal 15. As general use of the player 2, it is possible to listen to music by connecting a conventional ordinary wired headphone to the headphone terminal 15.

The BT adapter 1 receives an analog audio signal having been output from the player 2, and converts the analog signal into a modulated signal. For instance, pulse code modulation (PCM) may be used. In addition, the BT adapter 1 compresses the modulated signal by using a compression technique, which is called Sub Band Coding (hereinafter "SBC"), regulated according to the AV profile standards, and transmits the signal to the BT headphones 3 and 4 complying with a communication protocol conforming to the AV profile standards via an antenna 10. The BT headphones 3 and 4 are headphones having radio communication functionality conforming to the BT standards.

Referring to FIGS. 1 and 2, a hardware configuration of the BT adapter 1 will be described hereunder.

As shown in FIG. 2, the BT adapter 1 has a bus 1B that transmits signals, and components coupled to the bus 1B. The analog audio input terminal 15 connectable to the headphone terminal of the player 2 is coupled to the bus 1B through an A/D convertor 107, and an input level control circuit 108. The A/D converter 107 converts the analog audio signal that is input from the analog audio input terminal 15 via the input level control circuit 108, into a pulse code modulation signal (hereinafter "PCM signal").

The bus 1B is coupled to an antenna 10 for receiving and transmitting radio waves in a band of 2.4 GHz, a BT-standard radio module 100 (hereinafter "BT module"), a microprocessor unit 101 (hereinafter "MPU"), and a Read Only Memory (hereinafter "ROM") 102, a Random Access Memory (hereinafter "RAM") 103, and an Electronically Erasable and Programmable Read Only Memory (hereinafter "EEPROM") 104.

The BT module 100 includes, for example, an RF circuit that performs frequency hopping control and the like operation, and a base-band control circuit. The BT module 100 is adapted to shift to various BT modes including a power saving mode, in response to instructions from the MPU 101.

The MPU 101, namely any circuitry that processes data such as a general microprocessor, an application specific integrated circuit, a digital signal processor, a microcontroller, or some type of programmable logic device, manages control of the BT adapter 1. The MPU 101 operates in accordance with program codes stored in the ROM 102 to control the overall device. The ROM 102 programs for operation of the MPU 101. The RAM 103 is writable and readable memory and is used by the MPU 101 as various work memories. The EEPROM 104 is a writable nonvolatile memory for storing address information of, for example, connection destinations, under the control of the MPU 101.

In addition, the BT adapter 1 comprises a digital signal processor 105 (hereinafter "DSP"), a timer 106, a connection-mode switch 11, a liquid crystal display 12 (hereinafter "LCD"), a button set 13 including buttons and switches, an LED 14, a power-supply control circuit 111, a rechargeable battery 112, and an alternating current (hereinafter "AC") adapter terminal 113, coupled to the bus 1B. The LCD 12 couples the bus 1B via LCD control circuit 109. The button set 13 couples the bus 1B via button control circuit 110.

In response to instructions from the MPU 101, the DSP 105 compresses and encodes audio data converted by the A/D converter 107 into digital data. As described in detail below, in response to instructions from the MPU 101, the timer 106 performs timer count operations to measure the time relevant to a communication connection procedure.

The connection-mode switch 11 is a switch for shifting between a simple connection mode and a normal connection mode. The LCD 12 displays various information such as device status via the LCD control circuit 109 in accordance with control by the MPU 101. The operation button set 13 transfers operation information corresponding to buttons and/or switches operated by a user to the MPU 101 via the button control circuit 110. The operation button set 13 includes the connection button 13a relevant to the present embodiment.

The LED 14 is a light-emitting element that notifies the user of device status by way of a lit state under control of the MPU 101. The power-supply control circuit 111 controls the power supply that supplies power to the device in response to the control by the MPU 101. The rechargeable battery 112 is a battery that is chargeable with an AC power supply supplied from the AC adapter terminal 113.

With reference to FIGS. 1 and 3, a hardware configuration of the BT headphone 3 (or 4) will be described.

As shown in FIG. 3, the BT headphone 3 has a bus 3B that transmits signals, and components coupled to the bus 3B. The bus 3B couples an antenna 20 receiving and transmitting radio waves in a band of 2.4 GHz, and the antenna 20 is coupled to a BT-standard radio module 200 (hereinafter "BT module"). The BT headphone 3 has a microprocessor unit 201 (hereinafter "MPU"), and a Read Only Memory (hereinafter "ROM") 202, a Random Access Memory (hereinafter "RAM") 203, and an Electronically Erasable and Programmable Read Only Memory (hereinafter "EEPROM") 204.

The BT module 200 includes, for example, an RF circuit that performs frequency hopping control and a base-band control circuit. The BT module 200 is adapted to shift to various BT modes including a power saving mode, in response to instructions from the MPU 201.

The MPU 201, namely any circuitry that processes data such as a general microprocessor, an application specific integrated circuit, a digital signal processor, a microcontroller, or some type of programmable logic device, manages control of the BT headphone 3. The MPU 201 operates in accordance with program codes stored in the ROM 202 to control the overall device. The ROM 202 stores programs for operation of the MPU 201. The RAM 203 is a writable and readable memory and is used by the MPU 201 as various work memories. The EEPROM 204 is a writable nonvolatile memory for storing address information of, for example, connection destinations, under the control of the MPU 201.

In addition, the BT headphone 3 has a digital signal processor 205 (hereinafter "DSP"), a timer 206, a D/A converter 207, a power amplifier 208 coupled to the D/A converter 207, a speaker unit 22 coupled to the power amplifier 208, a connection-mode switch 21, a button set 23 including buttons and switches, an LED 24, a power-supply control circuit 210, a rechargeable battery 211, and an AC (alternating current) adapter terminal 212, which are coupled to the bus 3B. The button set 23 is coupled to the bus 3B through a button control circuit 209.

The DSP 205 decodes audio data in response to instructions from the MPU 201. The timer 206 performs timer count operations to measure the time related to a communication connection procedure in response to instructions from the MPU 201. The D/A converter 207 converts digital audio data, which has been decoded by the DSP 205, into analog audio signal. The power amplifier 208 amplifies the power of the analog audio signal generated by the D/A converter 207. As shown in FIG. 1, the speaker unit 22 is disposed in an ear pad portion of the device main body, and converts the analog audio signal, which has been power-amplified by the power amplifier 208, into a sound wave.

The connection mode switch 21 is a switch for shifting between the simple connection mode and the normal connection mode. The operation button set 23 transfers operation information corresponding to buttons and/or switches operated by a user to the MPU 201 via a button control circuit 209. The operation button set 23 includes connection buttons 23a relevant to the present embodiment.

The LED 24 is a light-emitting element that notifies the user of device statuses by way of a lit state under control of the MPU 201. The power-supply control circuit 210 controls the power supply that supplies power to the device in response to the control by the MPU 201. The rechargeable battery 211 is a battery chargeable with an AC power supply supplied from the AC adapter terminal 212.

The radio communication connection (hereinafter "radio connection") procedure in the simple connection mode of the present embodiment will be described with reference primarily to flowcharts shown in FIGS. 4A, B and 5 and a timing chart shown in FIG. 6.

Figure 4A:
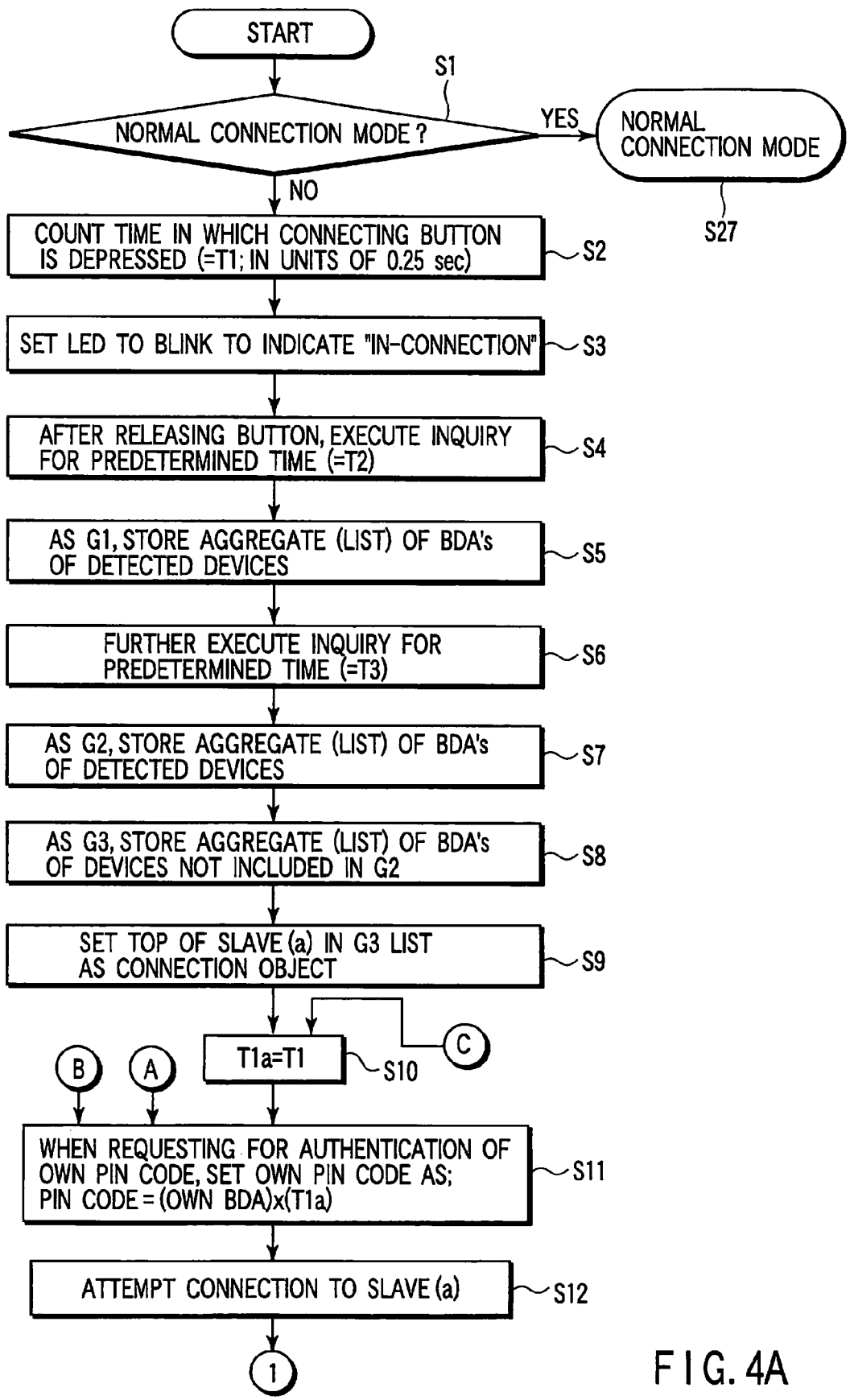
FIG. 4 is an exemplary flowchart showing the flow of operation in the audio conversion adapter for establishing the radio connection in a simple connection mode in the embodiment.
Figure 4B:
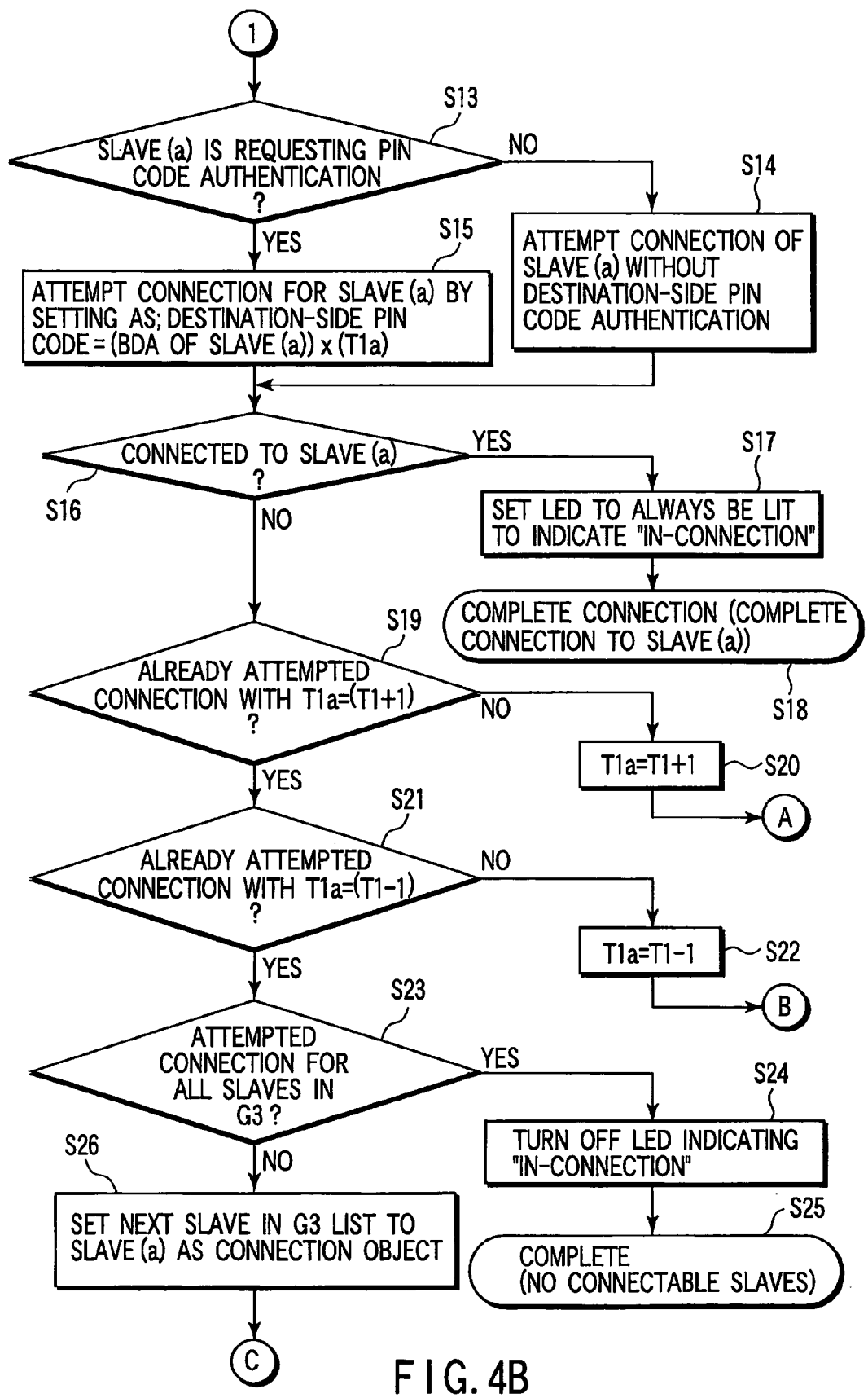
Figure 5:
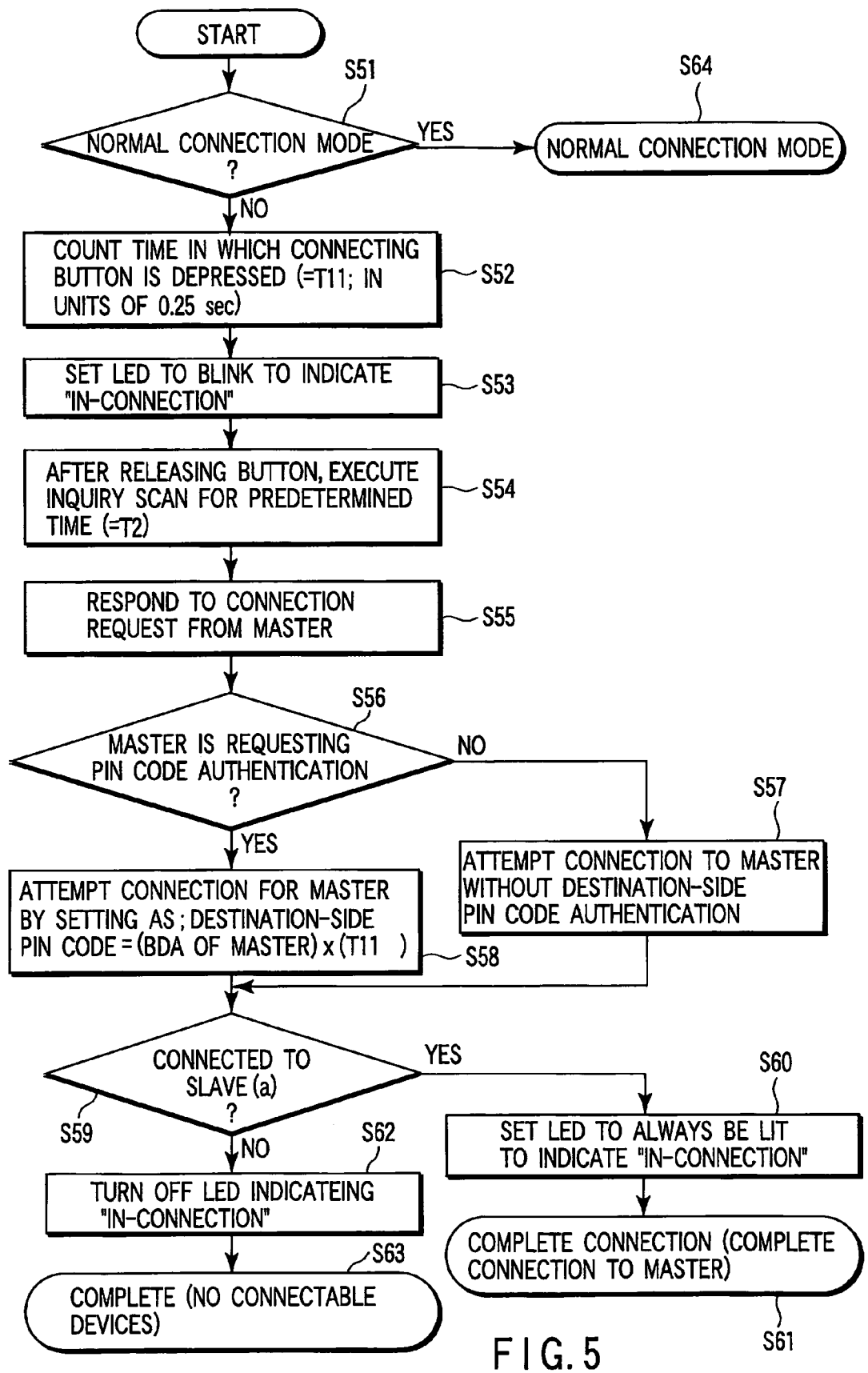
FIG. 5 is an exemplary flowchart showing the flow of operation in the wireless headphone for establishing the radio connection in the simple connection mode according to the embodiment.

FIGS. 4A, B shows operation of the BT adapter 1 serving as a master device and FIG. 5 shows operation of the BT headphone 3 acting as a slave device.

Referring to FIG. 1, a user operation method in the simple connection mode will first be described.

For the simple connection mode of the present embodiment, the BT adapter 1 acting as the master device should be set by the switch 11 to the simple connection mode. Similarly, the BT headphone 3 acting as the slave device should be set by the switch 21 to the simple connection mode. The switches 11 and 21 are switches that shift between the simple connection mode and the normal connection mode as described.

A case is now assumed that the BT headphone 3 and the BT adapter 1 are radio-connected together for a user to listen to, for example, music, through the BT headphone 3. The user operates each of switches 11 and 21 to set the modes to the simple connection modes, then depresses each of the connection buttons 13a and 23a of the BT adapter 1 and the BT headphone 3 at substantially the same time, holds them depressed for a while, and then releases them (RELEASE). By these operations, the respective LEDs 14 and 24 of the BT adapter 1 and the BT headphone 3 are lit to indicate an in-connection state, i.e. to indicate completion and establishment of radio connection.

Next, referring to FIGS. 4A, B and 6, operations relevant to the radio connection establishment procedure of the BT adapter 1, acting as the master device, will be described herein below.

As shown in FIGS. 4A, B, in the BT adapter 1, when the simple connection mode is set by the switch 11, blocks S2 to S26 are executed (NO in block S1). On the other hand, when the normal connection mode is set by the switch 11, operation shown in FIG. 7, which is described below, are executed (YES in block S, S27).

In the BT adapter 1, upon depression of the connection button 13a, the timer 106 starts a count operation to count the time in units of, for example, 0.25 sec., and sets the count value to T1 (block S2). Specifically, as shown in FIG. 6, a time T1 from an ON time of the operation button 13a to a release time thereof. When the connection button 13a is depressed, the LED 14 for indicating in-connection state is lit (block S3).

Subsequently, during a predetermined time T2 after the connection button 13a has been released (RELEASE), the BT adapter 1 repeatedly executes Inquiry processing, which is shown as "80" in FIG. 6, for searching for a communication connection object, including the slave devices 3 and 4 of FIG. 1 (block S4). In this embodiment, the predetermined time T2 is about 20 sec.

BT adapter 1 stores into the RAM 103 an aggregate G1 of slave devices including BT headphones 3 which responded to the Inquiry processing (Inquiry Scan: connection standby state "90"), specifically, information about Bluetooth Device Addresses (hereinafter "BDA") thereof as G1 for convenience (block S5). Therefore, the aggregate G1 stored in the RAM 103 is data showing a list or table that includes BDAs. As shown in FIG. 6, out of a plurality of slave devices (a), and (b), the BT headphones 3 corresponding to the slave device (a) detected within the time T2 is stored by the BT adapter 1 as a communication connection object into the RAM 103.

Figure 8:
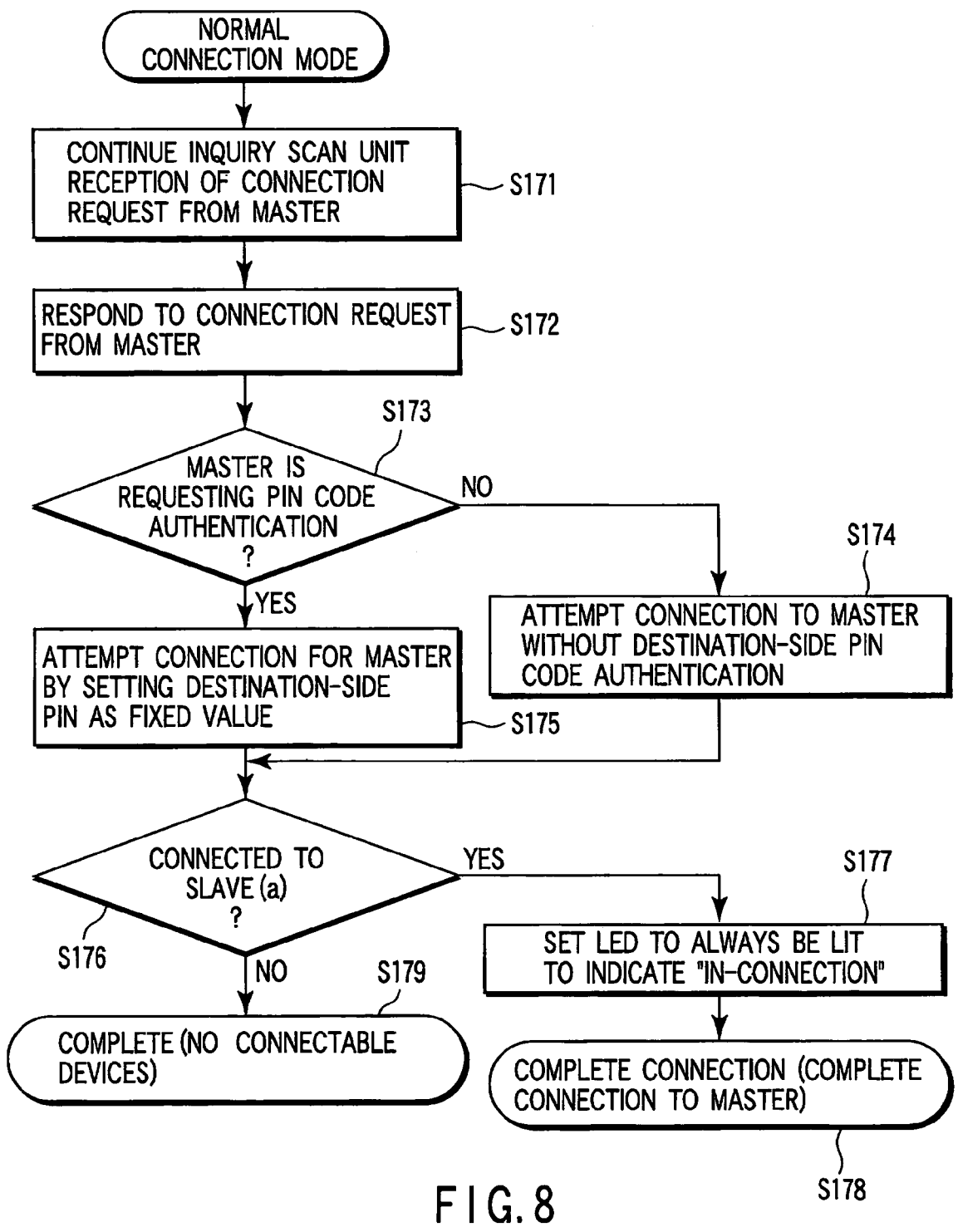
FIG. 8 is an exemplary flowchart showing the flow of the operation in the wireless headphone for establishing the radio connection in the normal connection mode according to the embodiment.

In addition, the BT adapter 1 repeatedly executes another Inquiry processing "81" in FIG. 8 during a predetermined time T3 after the time T2 (block S6). The predetermined time T3 is, in this embodiment, approximately 20 seconds. The BT adapter 1 stores into the RAM 103 an aggregate G2 of slave devices including slave (b) which responded to the Inquiry processing which is shown as Inquiry Scan "91" in FIG. 6 (block S7). The aggregate G2 stored in the RAM 103 includes data about the BDAs, and is data showing a list or table, as well as the aggregate G1. Herein, as shown in FIG. 6, the BT headphones 3 corresponding to the slave device (b) detected within the time T3 is stored by the BT adapter 1 as a communication object into the RAM 103.

Then, the MPU 101 of the BT adapter 1 references the RAM 103, and makes new aggregate G3 of slave devices that are included in G1 but not included in G2. After that, the MPU 101 stores the aggregate G3 into the RAM 103 (block S8). Thereby, in the communication connection objects included in the aggregate G3, there are included only slave devices which is BT headphones 3 or slave devices (a) in this case. In other words, the slave devices in the aggregate G3 are the devices which have been executing Inquiry Scan only during the predetermined time T2 after the operation of the connection button 13a with the master device operation, e.g. for turning ON and releasing (block S9).

Thereafter, the BT adapter 1 sequentially attempts connection to slave devices having BDAs included in the aggregate G3 that include BT headphones 3 (block S12). In this embodiment, connection authentication processing for radio connection to the connection-object slave device is not required. Therefore, the BT adapter 1 attempts connection without performing the authentication processing of a Personal Identification Number (hereinafter "PIN") code, which is an authentication code of the destination-side BT headphone 3 (NO in blocks S13, S14). When the connection to the BT headphone 3 is successful, the LED 14 is remained lit to indicate completion of radio connection, and the radio connection is completed and established (YES in blocks S16, S17, S18).

Figure 6:
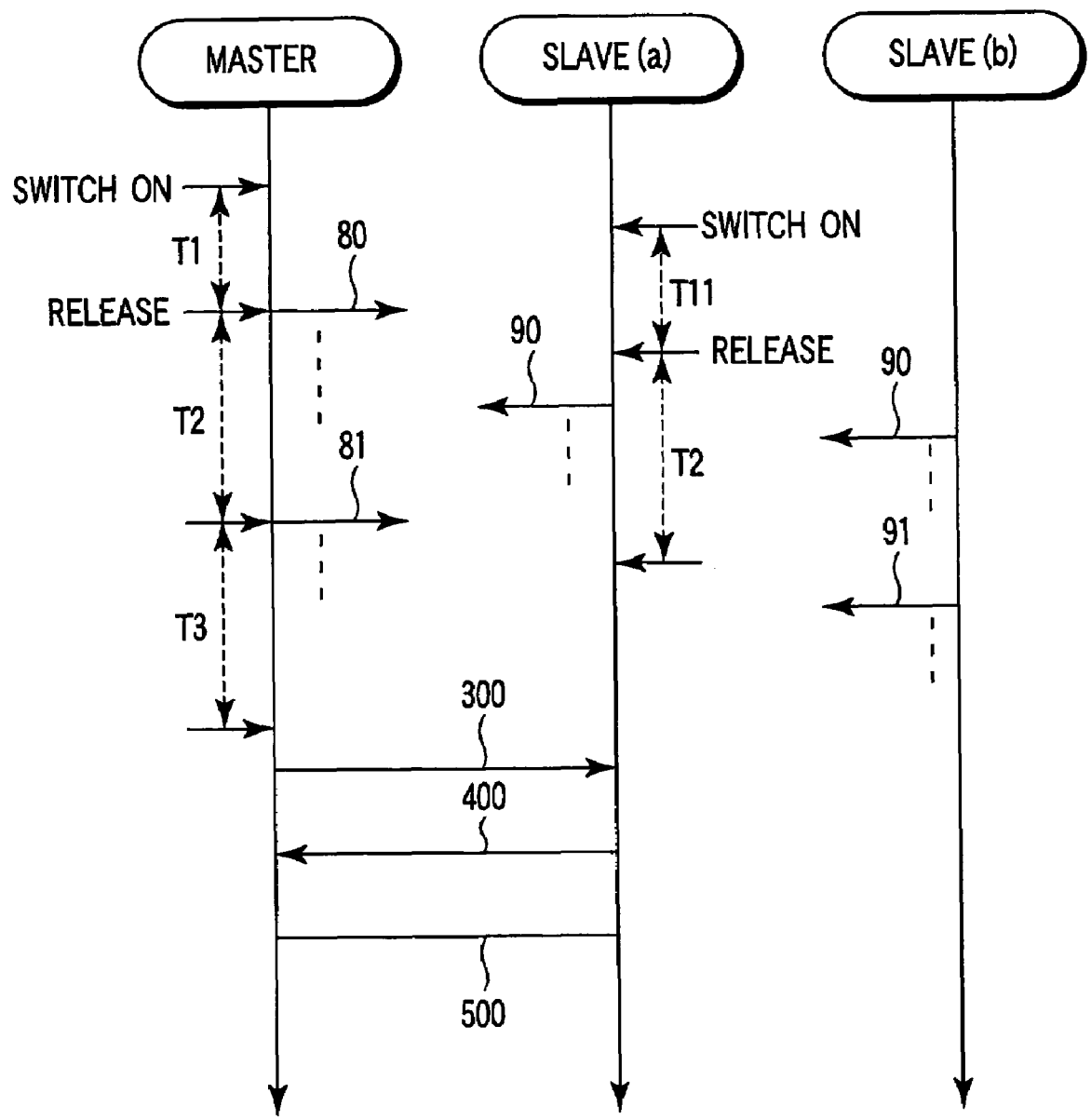
FIG. 6 is an exemplary timing chart for showing a procedure for establishing the radio connection in the simple connection mode according to the embodiment.

That is, as shown in FIG. 6, a connection request 300 is executed from the BT adapter 1. If a response 400 is received from the BT headphone 3 acting as the slave device (a), radio connection 500 between the BT adapter 1 and the BT headphone 3 is completed and established.

On the other hand, as shown in FIGS. 4A, B, when the connection authentication processing is required and performed, the BT module 100 and the MPU 101 of the BT adapter 1 executes connection authentication process using a time count value T1 obtained from the timer 106 (block S10, YES in S13). In more detail, the BT module 100 executes connection authentication using PIN codes in accordance with the three types "T1a=T1, T1a=T1−1, and T1a=T1+1". According to the method, subtle errors in the time count value T1 representing the time of depression of the connection button 13a may be reflected.

First, when the BT adapter 1 requests a communication connection object for PIN code input, the BT adapter 1 sets its own PIN code to "own BDA×T1a" (block S11). In addition, when the BT headphone 3 acts as the slave device of the communication connection object, it is assumed that the PIN code of the BT headphone 3 is set to be "(in-connection-process) slave device BDA×T1a".

Upon being requested from the destination-side BT headphone 3 for the PIN code authentication in response to a connection request, the BT adapter 1 attempts radio connection by using the destination-side PIN code "BDA of slave device 3×T1*a*" (YES in blocks S12, S13, S15). When the connection with the BT headphone 3 is successful, the LED 14 is lit for a specified duration to indicate completion of radio connection, and the connection is completed and established (YES in blocks S16, S17, S18).

On the other hand, when radio connection is not successful through the connection authentication based on the PIN code "BDA of slave device 3×T1*a*" with "T1*a*=T1", the BT adapter 1 attempts connection set to "T1*a*=T1+1" (NO in block S16, NO in S19, S20). In addition, the BT adapter 1 attempts connection set to "T1*a*=T1−1" (NO in block S16, YES in block S19, NO in blocks S21, S22).

Then, the BT adapter 1 attempts connections to individual slave devices included in the aggregate G3 until such connections are successful (NO in blocks S23, S26). When connection to all the slave devices in G3 is not successful, the LED 14 is turned off, and the processing terminates in the state that radio connection is failure (YES in blocks S23, S24, S25).

FIG. 5 shows operation of the BT headphone 3 serving as a slave device.

When the simple connection mode is set by the switch 21, the BT headphone 3 executes the process of blocks S52 to S63 (NO in block S51). On the other hand, if the normal connection mode is set by the switch 21, the BT headphone 3 executes process shown in FIG. 8, which is described below (YES in blocks S51, S64).

Upon depression of the connection button 23*a*, the timer 206 in the BT headphone 3 starts a count operation to count the time in units (e.g., 0.25 seconds) wherein the count value is represented by T11 for this embodiment (block S52). Specifically, as shown in FIG. 6, the timer 206 counts a time T11 from an ON time of the operation button 23*a* to a release time thereof. When the connection button 23*a* is depressed, the LED 24 for indicating in-connection state is lit (block S53).

Subsequently, during a predetermined time T2 after the connection button 23*a* has been released (RELEASE), the BT headphone 3 executes Inquiry Scan processing ("90" in FIG. 8) (block S54). The predetermined time T2 is 20 sec. in this embodiment.

BT headphone 3 responds (attempt for connection) to a connection request from the BT adapter 1, which is acting as the master device (block S55). At this time, if connection authentication processing for radio connection to the connection-object master device is not required, the BT headphone 3 attempts radio connection without performing the authentication processing of a PIN code of the destination side (NO in blocks S56, S57). When the connection to the BT adapter 1 is successful, the LED 24 is remained lit to indicate completion of radio connection, and the radio connection is completed and established (YES in blocks S59, S60, S61).

On the other hand, when connection authentication processing is required and performed, the BT headphone 3 executes the connection authentication processing using a time count value T11 obtained from the timer 206 (YES in block S56). First, when requesting the destination for PIN code input, the BT headphone 3 sets its own PIN code to "own BDA×T11". In addition, it is assumed that the BT adapter 1 acting as the master device sets its own PIN code to be "(in-connection-process) master device BDA×T11".

The BT headphone 3 attempts radio connection to the BT adapter 1 at the connection-requesting destination by using the destination-side PIN code "BDA of the BT adapter 1×T11" (block S58). When the radio connection with the BT adapter 1 is successful, the LED 14 is remained lit to indicate completion of connection, and the radio connection is completed and established (YES in blocks S59, S60, S61). On the other hand, when connection is not successful, the LED 24 is turned off, and the processing terminates in the state that radio connection is failure (NO in blocks S59, S62, S63).

According to the present embodiment described above, the radio communication connection procedures are executed to automatically search and detect individual connection objects within the predetermined time T2 after the connection buttons 13*a* and 23*a* of the respective BT adapter 1 acting as the master device and BT headphone 3 are depressed at substantially the same time.

Accordingly, radio connection may be implemented between electronic devices poorly equipped with user interface devices, particularly those such as a large character display device sufficient to perform information display and a keyboard through which menu selection, character input, and the like operations are easily performed. In addition, since the user is simply required to operate the shifting switch for the connection modes of the master device and the slave device and to operate the respective connection switches at the substantially the same time, the operation method for establishing communication connection is easy. Further, in this embodiment, since only an electronic device of which connection button is depressed with substantially the same timing is selected as a connection object, the risk of erroneous connection to an unintended device is reduced, thereby enabling security in communication connection to be enhanced.

Further, according to this embodiment, a connection authentication method may be provided in which a value corresponding to a time count value (T1 or T11) of the time when each of the connection buttons 13*a* and 23*a* is depressed in the event of the connection authentication processing is used as an authentication code, e.g., PIN code. In this case, the PIN code is generated in accordance with the lengths of time in which the respective connection buttons are depressed, and PIN code authentication is successful only when the lengths of time are substantially match each other, so that security in the connection event may be improved. Further, in the master device, when a value created by adding a predetermined error span (−1 or +1) to the time count value (T1) of the time in which the connection button is depressed is used as authentication code. Therefore, even though there is a subtle error, i.e. the difference between the time count values T1 and T11 is relatively short and is within a predetermined time, it may be neglected. A BDA of a destination device that has been finally successful in connection is stored into the EEPROM.

According to the present embodiment, in any one of the master device and the slave device, not only the simple connection mode, but also a normal connection mode may be set by the respective connection mode switch 11 or 21. The normal connection mode refers to a communication connection procedure for selecting a connection destination from an aggregate (LIST).

Figure 7:
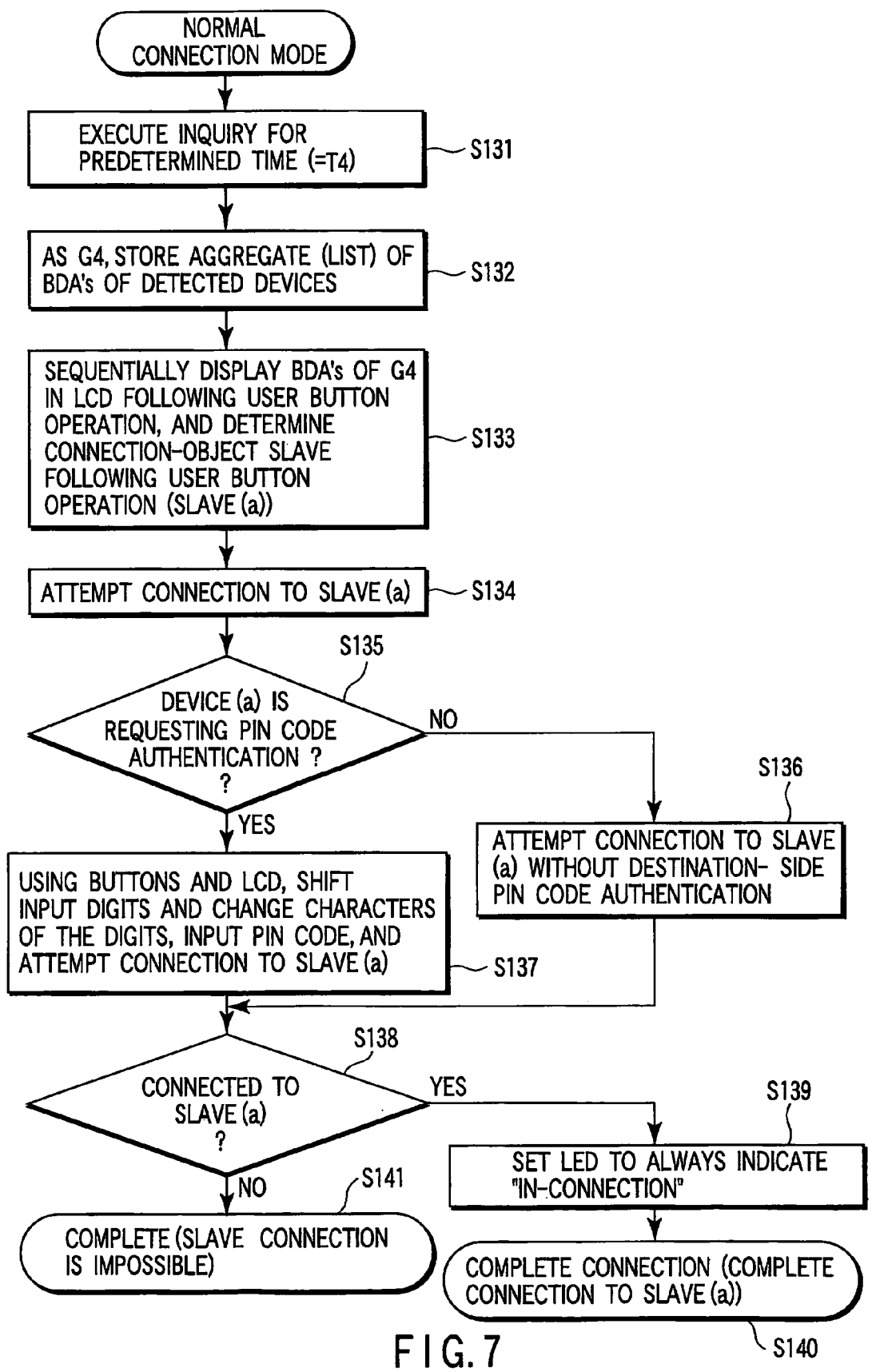
FIG. 7 is an exemplary flowchart showing the flow of the operation in the audio conversion adapter for establishing the radio connection in a normal connection mode according to the embodiment.

Referring to a flowchart of FIG. 7, operation of the BT adapter 1, acting as the master device, will be described herein below.

In the normal connection mode, the BT adapter 1 performs Inquiry processing for a predetermined time T4 and thereby performs searches for slave devices including BT headphones 3 under execution of Inquiry Scan (block S131). The predetermined time T4 is about 20 sec. in this embodiment. The BT adapter 1 stores an aggregate (LIST) of BDAs of slave devices detected in the searches into the EEPROM 104 as G4 (block S132).

Subsequently, the BT adapter 1 displays the BDA aggregate (LIST) of G4 on the LED 12 (block S133). The LED 12 is unable to display more than one line of characters at one time. As such, a connection-object slave device is determined by shifting the BDA display through user operation of the operation button set 13.

While a BDA of a connection-object slave device is being displayed on the LCD 12, when the operation button 13a is operated, the BT adapter 1 attempts connection to the selected slave device (block S134).

In this case, the BT adapter 1 sets a fixed value of a PIN code preset through user operation of the operation button set 13 to be as its own PIN code.

When PIN-code based connection authentication is not requested from the connection-object slave device, the BT adapter 1 attempts connection without performing authentication processing of the destination-side PIN code (NO in blocks S135, S136). When the connection to the slave device is successful, the LED 14 is remained lit to indicate completion of radio connection, and the radio connection is completed and established (YES in blocks S138, S139, S140).

On the other hand, when PIN-code based connection authentication is requested from the connection-object slave device, the BT adapter 1 attempts connection by using the destination-side PIN code having been input using the LCD 12 and the operation button set 13 (YES in blocks S135, S137).

In comparison with electronic devices such as personal computers and cellular phones, the BT adapter 1 is not provided with an input device having a sufficient button set, so that input operations are performed in a manner as described hereunder. For example, buttons [←] and [→] are operated to change input digit positions. In addition, for example, buttons [↑] and [↓] are operated to change characters in the input digit positions (for example, the alphanumerical characters are changed as 0→1→2→. . . →A→B→C→. . . →Z→0).

When the connection to the slave device is successful, the LED 14 is lit to indicate completion of radio connection, and the radio connection is completed and established (YES in blocks S138, S139, S140). When both of devices are connected each other, the connection is failure (NO in blocks S138, S141).

Through the operations described above, the BT adapter 1 acting as the master device is enabled in the normal connection mode to perform connection processing for connection to conventional slave devices including BT headphones 3.

Next, referring to a flowchart of FIG. 8, operation of the BT headphone 3 acting as the slave device will be described herein below.

In the case of the normal connection mode, the BT headphone 3 continues Inquiry Scan until reception of a connection request from a master device including a BT adapter 1 (block S171). In this state, when a connection request is received after having been detected by the master device through the Inquiry processing, the BT headphone 3 responds to that connection request (block S172). In this case, the BT headphone 3 sets a fixed value of a preset PIN code as its own PIN code. In the case of the BT headphone 3, because it does not have a display device for displaying a PIN code and a button or switch for inputting the PIN code, the operation of changing the own PIN code is difficult.

When PIN-code based connection authentication is not requested from the master device requesting for radio connection, the BT headphone 3 attempts connection without performing authentication processing of the destination-side PIN code (NO in block S173, S174). When the radio connection with the master device is successful, the LED 24 is lit to indicate completion of radio connection, and the radio connection is completed and established (YES in block S176, S177, S178).

On the other hand, when PIN-code based connection authentication is requested from the master device requested for radio connection, the BT headphone 3 attempts connection by using the preset fixed value as the destination-side PIN code (YES in blocks S173, S175). Also in this case, in the case of the BT headphone 3, because it does not have a display device for displaying a PIN code and a button or switch for inputting the PIN code, it is difficult to input an arbitrary value used as the destination-side PIN code.

When the radio connection with the master device is successful, the LED 24 is remained lit to indicate completion of radio connection, and the radio connection is completed and established (YES in blocks S176, S177, S178). When both of the devices are connected with each other, the radio connection is failure (NO in blocks S176, S179).

Through the operations described above, the BT headphone 3 acting as the slave device is enabled in the normal connection mode to perform connection processing for radio connection to a conventional master device including the BT adapter 1. However, a connectable master device is only a master device that does not request for PIN code authentication or that has a PIN code matching the slave-device side fixed value.

While the present embodiment has been discussed referring to the case where the BT adapter 1 is used as the master device and the BT headphones 3 and 4 are used as the slave devices, it may of course be applied to other electronic devices having BT-standard radio communication functionalities. Further, even in the case of an electronic device, it may be applied to an electronic device having radio communication functionality with a communication connection procedure other than the BT standards.

According to the simple connection mode of the present embodiment, the headphone 3 responds to only the inquiry provided within the predetermined time T2, though, the headphone 3 may respond to only the inquiry provided within the predetermined time T3. In this case, the MPU 101 of the BT adapter 1 references the RAM 103, and makes new aggregate G3 of slave devices that are included in G2 but not included in G1. Then, the BT adapter 1 decides a slave device on the basis of the aggregate G3, as well.

Furthermore, the predetermined time T2, and T3 may be changed to appropriate length of time other than 20 sec.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for establishing a radio connection between radio communication devices, comprising:
    executing a predetermined number of inquiry processes within an interval in response to an operation of a first connection switch in a first radio communication device;
    executing a lesser number of inquiry scan processes than the predetermined number of inquiry processes in response to an operation of a second connection switch in a second radio communication device; and
    establishing a radio connection between the first radio communication device and the second radio communication device when a time difference between each operation of the first connection switch and the second connection switch is within a predetermined time period.

2. A method according to claim 1, wherein the first radio communication device functions as a master device, and the second radio communication device functions as a slave device.

3. A method according to claim 2, further comprising:
performing a process of determination the second radio communication device as a communication connection object of the first radio communication device when the operation of the second connection switch occurs within the predetermined time period after the operation of the first connection switch.

4. A method according to claim 3, wherein the performing of the process comprises:
broadcasting a first inquiry from the first radio communication device to devices surrounding the first communication device within a first predetermined time period after the operation of the first connection switch; and
broadcasting a second inquiry from the first radio communication device to devices surrounding the first communication device within a second predetermined time period after broadcasting of the first inquiry,
wherein the first radio communication device determines a device which responds to only one of the first inquiry and the second inquiry, as the communication connection object.

5. A method according to claim 4, further comprising:
measuring a first time period of the operation of the first connection switch;
setting a first code on the basis of the first measured time period;
measuring a second time period of the operation of the second connection switch;
setting a second code on the basis of the second measured time period; and
comparing the first code with the second code when executing the establishment of the radio connection.

6. A method according to claim 5, wherein the first code and the second code is calculated in accordance with a value obtained by performing addition or reduction of an error span on the first time period.

7. A method according to claim 1, further comprising:
switching from a first mode that establishes the radio connection without the first connection switch and the second connection switch to a second mode which establishes the radio connection using the first connection switch and the second connection switch.

8. A communication device for communication with an external device, comprising:
a switch;
a radio communication unit to communicate with an external device; and
a control unit coupled to the switch and the radio communication unit, the control unit controlling the radio communication unit to execute a predetermined number of inquiry processes outputting inquiry signal to devices surrounding the communication device after the switch is operated, and establishing a radio connection exclusively with the external device that provides a specific response comprising a lesser number of responses to the inquiry signals than the predetermined number of inquiry processes.

9. A communication device according to claim 8, farther comprising:
a timer coupled to the switch, the timer to output data corresponding to a time period of operation of the switch;
means for setting a code using the data; and
means for performing authentication with the code when establishing the radio connection with the external device.

10. A communication device according to claim 8, further comprising:
a second switch to switch from a first mode which uses the switch for establishing the radio connection to a second mode which establishes the radio connection without the switch.

11. A communicating device for communicating with an external device, comprising:
a switch;
a radio communication unit to communicate with the external device; and
a control unit coupled to the switch and the radio communication device, the control unit (i) controlling the radio communication device, when the radio communication unit received inquiry signals based upon a predetermined number of inquiry processes from the external device for a predetermined time after the switch is in operation, returning a specific response comprising a lesser number of responses to the inquiry signals than the predetermined number of inquiry process, and (ii) establishing a radio connection with the external device.

12. A communication device according to claim 11, wherein the predetermined time includes a first predetermined time and a second predetermined time.

13. A communication device according to claim 12, wherein the specific response comprises a combination of a response corresponding to the inquiry signal provided within one of the first predetermined time and the second predetermined time, and a non-response to the inquiry signal provided within the other one of the first predetermined time and a second predetermined time.

14. A communication device according to claim 11, further comprising;
a timer coupled to the switch, the timer to output data corresponding to a length of time of operation of the switch;
means for setting a code using the data; and
means for performing authentication with the code when establishing the radio connection with the external device.

15. A communication device according to claim 11, further comprising;
a second switch to switch from a first mode using the switch for establishing the radio connection to a second mode for establishing the radio connection without the switch.

* * * * *